United States Patent [19]
Chance

[11] 3,811,777
[45] May 21, 1974

[54] TIME-SHARING FLUOROMETER AND REFLECTOMETER

[76] Inventor: Britton Chance, c/o Johnson Research Foundation Medical School, Philadelphia, Pa. 19104

[22] Filed: Feb. 6, 1973

[21] Appl. No.: 330,041

[52] U.S. Cl. ............... 356/73, 23/230 B, 128/2 L, 250/458, 356/85, 356/97, 356/188, 356/211
[51] Int. Cl. ........ G01n 21/00, G01j 3/30, G01j 3/48
[58] Field of Search ........ 250/227, 217 R, 458, 461; 128/2 L; 356/72, 73, 96, 97, 186, 188, 189, 209, 211, 85; 23/230 B

[56] References Cited
UNITED STATES PATENTS
| | | | |
|---|---|---|---|
| 3,512,889 | 5/1970 | Liston | 356/96 |
| 3,392,624 | 7/1968 | Ke et al. | 356/186 |
| 3,461,856 | 8/1969 | Polanyi | 128/2 L |
| 3,711,723 | 1/1973 | McMurtry | 250/227 |

OTHER PUBLICATIONS
A Fiber Optics Reflectance Attachment; pp. 448–449; Agricultural Engineering; Aug. 1967.

Primary Examiner—Ronald L. Wibert
Assistant Examiner—V. P. McGraw
Attorney, Agent, or Firm—Herman L. Gordon

[57] ABSTRACT

A spectrophotometric probe apparatus including a light source, a photomultiplier and a rotary filter wheel, with respective light pipes located to receive excitation light through one filter from the source and to transmit emission or reflectance light through an opposite filter to the photomultiplier. The remote ends of the light pipes are located adjacent to the area of observation and may be secured together to form a bundle. An additional light pipe may be added to the bundle to inject a photolysis flash on the tissue being studied, and the bundle may be attached to a chamber which can be implanted adjacent the living tissue and which is provided with ducts for passing perturbation gases through the chamber.

12 Claims, 4 Drawing Figures

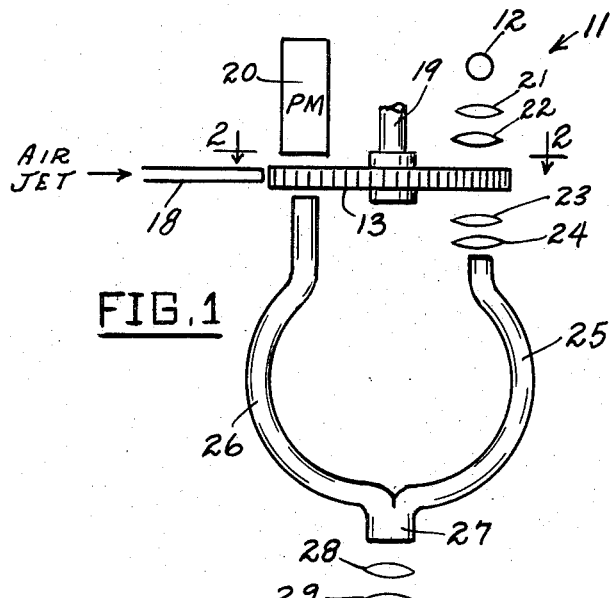
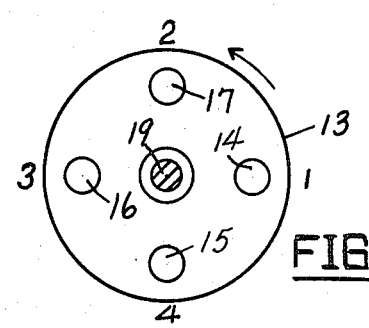
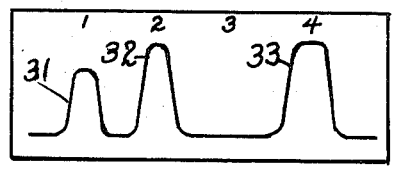
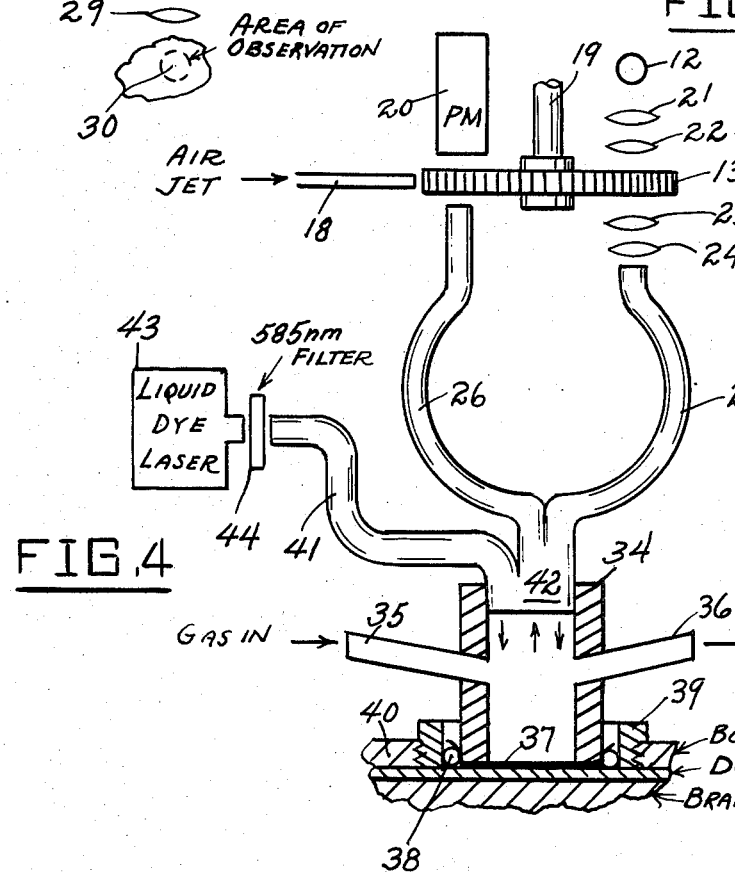

TIME-SHARING FLUOROMETER AND REFLECTOMETER

This invention relates to spectrophotometry, and more particularly to an improved technique and apparatus for the spectrophotometric study of living tissue.

A main object of the invention is to provide a novel and improved technique and apparatus for the spectrophotometric study of living tissue, the technique being directed toward the observation of oxidation-reduction effects in tissue in terms of the fluorescence characteristics of components thereof and employing apparatus which can be readily and reliably positioned adjacent the tissue under study and which is adapted to provide easily interpreted electrical readout signals.

A further object of the invention is to provide an improved technique and apparatus for facilitating the study of reactions of living tissue to factors creating abnormalities, such as the effects of shock and stroke, and the like, from the standpoint of changes in fluorescence of tissue components produced by abnormalities, and as a result of flash photolysis under controlled perturbation conditions.

Further objects and advantages of the invention will become apparent from the following description and claims, and from the accompanying drawings, wherein:

FIG. 1 is a diagrammatic view showing the salient elements of one form of spectrophotometric apparatus employed in carrying out the technique of the present invention.

FIG. 2 is a plan view taken substantially on line 2—2 of FIG. 1.

FIG. 3 is a graph showing a typical set of photomultiplier response pulses obtained with the apparatus of FIG. 1.

FIG. 4 is a diagrammatic view showing a modified form of spectrophotometric probe apparatus according to the present invention, including flash photolysis injection means and a chamber for exposing tissue under study to perturbations by flow gases.

A prime purpose of the present invention is to provide an improved technique and apparatus to facilitate the study of shock and stroke in experimental animals and ultimately in humans. The present invention contemplates a fluorometric approach, coordinated with reflectance and transmission spectrophotometry.

The technique employed in the present invention generally follows a well known method for the observation of the intra-cellular oxidation-reduction state in tissue in terms of the fluorescence characteristics of NADH. See, for example, the patent application of Britton Chance, Ser. No. 269,580, filed July 7, 1972, entitled "Method and Apparatus for Observing Rates of Reaction of Oxygen in Living Tissues."

In a technique such as that above referred to, it is desirable to modulate the fluorescence excitation in order to reduce interference from steady light. A more important function of the light modulator is to time-share several fluorescence excitation and emission or light absorption signals. A typical form of light modulator is a rotating disc which contains appropriate light filters. Such a disc can be small, and can be driven either electrically or by a small air turbine, the latter providing speeds of the order of 200 Hz in an operation which is quiet and vibration-free and which affords a response time well within the needs of tissue readout (about 5 msec.).

The improved technique of the present invention includes the use of light pipes to provide coupling between fluorescence excitation of the biological specimen and the emission or reflectance measuring means. Light pipe assemblies afford a highly effective coupling between fluorescence excitation and the tissue surface, being flexible and readily movable. Such an assembly may contain a quartz or other wide-range transmittance fiber for conveying the fluorescence excitation, and a second set of fibers transmitting visible light, suitable for guiding the fluorescence emission or reflected light from the tissue surface to the detecting photomultiplier.

With respect to detection and signal handling, in the case of time-shared excitation and reflectance illumination of the tissue surface, the separation of such signals is readily afforded by the use of a gate generator coupled directly to the modulator disc. Such a gate generator may consist of a small light source and a photo diode, between which is interposed a screen suitable for generating the proper waveform, often sinusoidal. These waveforms are shaped so as to give gates which occur at precisely determined intervals and select portions of the photomultiplier output waveform, which are then amplified and processed appropriately for display on a multi-channel recorder. Appropriate gain and response time controls, and add or subtract modes, are provided. In a particular case, the NADH fluorescence signal obtained from the tissue would be detected and directly recorded, after having been "bucked out" by an appropriate steady voltage, providing that a steady light source was employed. If, however, a water-cooled high pressure arc, which is inherently unsteady, were employed, a portion of the excitation light would be reflected onto a compensating photomultiplier whose output would be made equal to that of the fluoresence signal by appropriate attenuation circuits and subtracted from it, thereby compensating for fluctuations in the excitation light. This type of compensation means is disclosed in U.S. Pat. No. 3,666,362, to Britton Chance, issued May 30, 1972, entitled "Dual Wavelength Spectrophotometry."

In a typical embodiment employing the technique of the present invention, reflectance at 366 nm is obtained as a light pulse and its amplitude is measured and subtracted from a standard voltage. The reflectance signal can be displayed directly or put through an appropriate electrical network so that it can be applied directly to the NADH fluorescence signal as a correction term. A variety of wavelengths can be used for reflectance measurements. Presumably one near the isosbestic point for the oxyhemoglobin-hemoglobin absorbancy change at approximately 600 nm would be appropriate. If, however, the reflectance is to simulate exactly that which is observed by the fluorometer, the 366 nm band can be employed.

Oxyhemoglobin signals can be obtained directly by reflectance, employing wavelengths in the region 540–580 nm where hemoglobin absorbancy changes between the oxy- and deoxy- forms are very large, or in a region around 660 nm. With a steady light source, the hemoglobin absorbancy signal can be obtained by measurement at a single wavelength. It is more appropriate, however, to employ the absorbancy difference at a pair of wavelengths, as in the dual wavelength method, and for this purpose two filters can be used, for example, at 540 and 600 nm, and the absorbancy difference measured. The techniques for signal handling in absorbancy difference measurements are now well known and consist simply of storing the peak amplitude of one pulse and adding it to the inverted stored information from the previous time.

In a typical configuration according to the present invention, a filter disc having four apertures is employed, two containing filters for fluorescence excitation at 366 nm and emission measurement at 480 nm. When the 366 nm filter is in line with the light source, NADH fluorescence emission will be transmitted via the 480 nm filter to the photomultiplier. When the disc has turned 180°, light at 480 nm will stimulate no fluorescence emission at 480 nm. Thus, every full cycle of the rotation will correspond to a flash of fluorescence emission.

The other two apertures of the light modulator preferably contain a pair of filters for measuring light scattering, either at the excitation wavelength so that its characteristics correspond to those affecting fluorescence, or at another wavelength where light scattering measurements are desired. In the first case, the remaining two apertures would contain a pair of 366 nm filters with a transmittance considerably less than that used for fluorescence excitation, so that the reflectance signal would be of the same order of magnitude of intensity as the fluorescence signal. When this pair of filters is aligned, light falls upon the sample and is reflected back to the photomultiplier, being transmitted by the corresponding filter. In this case, since both filters transmit similarly, equal signals would be obtained for each half-rotation of the disc.

Alternatively, the remaining two apertures can be employed for reflectance dual wavelength spectrophotometry of the hemoglobin concentration without the reflectance signal passing through the disc; a light pipe may be employed at the illuminated tissue surface to collect the reflected light and pass it directly to a separate photomultiplier.

A typical time-sharing optical assembly appropriate for these signals, which allows some flexibility in the choice of wavelengths for fluorescence and reflectance measurements is designated generally at 11 in FIG. 1. A tungsten iodine or mercury vapor lamp 12, or other suitable radiation emitter, is employed as a source. The apparatus has a small-diameter, air-driven rotating disc 13 containing four equally spaced filters 14, 15, 16 and 17, having diameters of the order of 15 mm, which provide both modulation of the light from the continuous source 12, thus rendering the associated electronic circuits less sensitive to room light, and a selection of wavelengths. The air turbine drive comprises a jet tube 18 which delivers a low-pressure air blast from a suitable source (for example, of the order of 10 psi) to the periphery of the disc, which may be suitably vaned or serrated. The disc 13 is suitably journalled on a stationary supporting shaft 19. At 200 Hz, the noise of the rotating disc 13 is not objectionable, and the complete cycle of time-sharing signals requires only 5 msec.

In the typical design, the filter 14 comprises a high-transmission fluorescence 366 nm excitation filter, and the opposite filter 16 comprises a high-transmission 480 nm fluorescence emission filter. These filters can conveniently be made of glass or gelatine, there being no need for narrow band filters, such as interference filters. Filters 15 and 17 are such as to provide reflectance signals at 366 nm, or at any other wavelength simply by substituting appropriate filters in their disc apertures; a combination of glass and gelatine filters will conveniently equalize the fluorescence and reflectance signals in order to avoid unnecessary overload on the photomultiplier, shown at 20.

As shown, the light from the source 12 is collimated by lenses 21, 22 and passes in a parallel path through disc 13 and is focussed by lenses 23, 24 on the end of the fluorescence excitation arm 25 of a composite light pipe, said light pipe assembly having an opposite arm 26 for transmitting fluorescence emission or reflected light to the filter diametrically opposite the filter viewed by arm 25. The 366 nm excitation light requires that arm 25 be of quartz; the opposite arm 26 may comprise glass, since 480 nm is readily transmitted through glass. The two fibers 25 and 26 are merged into a common unit or bundle 27 and are provided with suitable lenses 28, 29 to focus the end of element 27 on the area of observation, shown at 30.

The two light pipes 25 and 26 alternatively can be separated to afford oblique illumination of the sample in the event that specular reflections prove objectionable.

The configuration shown in FIG. 1 can be used for studying a single region or for scanning over various regions of the tissue under observation, such as various regions of brain cortex.

FIG. 3 shows a typical waveform diagram containing the signal pulses generated by the photomultiplier 20 during one cycle of rotation of filter disc 13. When filter element 14 is at position 1 in FIG. 2, the high-intensity 366 nm excitation light passes through arm 25 and produces 480 nm fluorescence emission which passes through arm 26 and filter element 16 and generates a signal pulse 31 in photomultiplier 20. When filter element 14 reaches position 2 in FIG. 2, the low-intensity 366 excitation light in arm 25 (derived from source 12 through filter element 15) produces 366 nm reflectance which passes through arm 26 and filter element 17 and generates a signal pulse 32 in photomultiplier 20. When filter element 14 reaches position 3 in FIG. 2 there is no signal pulse generated in photomultiplier 20 because the excitation light (produced by filter element 16) is 480 nm. When filter element 14 reaches position 4 in FIG. 2, the low-intensity 366 excitation light in arm 25 (derived from source 12 through filter element 17) again produces 366 nm reflectance which passes through arm 26 and filter element 15 and generates a signal pulse 33 in photomultiplier 20.

For a fluorometer circuit employing a stable light source, no electronic compensation is needed; the pulses 31 are peak-detected, compared against a reference voltage and displayed on a strip chart recorder. The same applies to the reflectance pulses 32, 33 which are suitably attenuated by the filter elements 15 and 17 so that their intensities are of the same order of magnitude as the pulses 31. The gates for the reflectance signals 32, 33 may have double the frequency of those for the fluorescence emission signals 31, so that both pulses 32 and 33 may be detected; however the signal from either one would be of suitable clarity. A peak detector and bucking circuit similar to that employed for the pulses 31 may be employed for the reflectance signals 32, 33.

The apparatus shown in FIG. 1 is adaptable either for use with microscope optics as part of a total microscope set-up, or for direct illumination through an objective lens without the use of visual monitoring. Also, in cases where excitation and emission are to be split, two separate light pipes can be employed.

The working end portion 27 of the light pipes 25, 26 may be attached to a chamber, such as that shown at 34 in FIG. 4, which can be suitably applied to the tissue to be studied for readout of the degree of NADH fluorescence, and the chamber 34 may be provided with means to apply a perturbation to the metabolism of the tissue, from which a stereotyped response of the NADH fluorescence would be expected of normal tissue, and wherein aberations would be detected in abnormal tissue. Thus, the chamber 34 may be provided with a gas inlet duct 35, for admitting gases such as oxygen, nitrogen, carbon monoxide, and the like, and with an outlet duct 36 for outward flow of the gases. The chamber 34 may be suitably implanted adjacent the tissue to be studied, and a transparent permeable membrane 37 may be employed between the end of the chamber and the living tissue under study. Thus, in the typical arrangement illustrated in FIG. 4, the membrane 37 is engaged over the end of the chamber 34 and is clamped thereto by an O-ring 38, which is in turn tightly received in a supporting ring 39 serving as the permanent implant means. For example, the ring 39 may be screwed into an aperture in the bone of the skull, shown at 40.

The arrangement shown in FIG. 4 also utilizes the technique of flash photolysis described in detail in the above-mentioned U.S. Pat. application Ser. No. 269,580. Thus, an additional light pipe 41 is provided, whose end is joined to the ends of the previously-described light pipe arms 25 and 26 in the working bundle 42 attached to the top end of chamber 34, as viewed in FIG. 4. The input end of light pipe 41 is located to receive a photolysis flash from a liquid dye laser 43 through a 585 nm filter 44.

As is pointed out in U.S. Pat. application Ser. No. 269,580, above referred to, oxidation of reduced pyridine nucleotide (PN) and flavoprotein (Fp), with a high rate of response, may be initiated in CO-inhibited cytochrome oxidase in living tissue in the presence of oxygen by a photolysis flash. The fractional extent of the photolysis response of PN and Fp indicates the fraction of the total mitochondrial population containing cytochrome $a_3$CO to which oxygen has diffused at the time of the photolysis flash, thereby providing an indication of the effectiveness of oxygen diffusion in the tissue without destruction of the tissue. A bright flash of light will liberate cytochrome $a_3$ from CO and the oxidase will immediately combine with oxygen, activating electron flow through the respiratory chain in a few hundred $\mu$sec. In this way, the true rate of NADH oxidation, as controlled by the ATP/ADP ratio rather than the diffusion rate, can be measured.

With the apparatus shown in FIG. 4, flash activation is accomplished by the liquid dye laser 43 at 585 nm, a wavelength suited to the absorbancy maximum of the cytochrome oxidase-carbon monoxide compound. The rapid response following photolysis of $a_3$:CO causes a readily measurable change of fluorescence, and the rate of this change is of great importance in determinations of mitochondrial function. Thus, the apparatus of FIG. 4 may be reliably employed for reading out the NADH redox level from the surface of the brain cortex, with appropriate compensation for reflectance artifacts. The chamber 34 may be employed for imposing a bio-chemical perturbation on the system, for example, a localized hypoxia. Reversal of this hypoxia by a combination of oxygen perfusion and a laser flash can be employed to reveal the bioenergetic environment of the mitochondria and their capacity for responding physiologically to this environment.

A fluorometric probe apparatus such as that shown in FIG. 4 may be employed as a long-term implant to precisely determine the effect of stroke upon regions of the brain. Such a device would have the purpose of reading out continuously the degree of pyridine nucleotide reduction in the tissue, and of periodically perturbing the tissue as well, in order to determine the bioenergetic state of the mitochondria by the kinetic method of local CO-intoxication and laser photolysis.

The localized hypoxia may be created by the flow of appropriate gases through the chamber 34. The membrane 37 is pressed against the dura, in the particular case illustrated in FIG. 4, or against the cortex itself in cases where the dura is too thick to permit gas equilibrium. The gas chamber 34 may be mounted in the skull bone 40 and may form the permanent element of the experimental assemblage; the light pipe assembly and gas connections may be inserted for appropriate studies, and this arrangement would permit a reasonable degree of freedom of the subject.

As above mentioned, the fluorometric probe apparatus may be used either for studying a single region or for scanning over an area of suspected hypoxia, employing an appropriate scan pattern and reading out variations of fluorescence over the tissue surface. The non-destructive nature of the fluorometric procedure, together with its high sensitivity, make it more suitable for scanning than other methods which are now available.

By employing a probe apparatus similar to that shown in FIG. 4, total intoxication of the subject is not necessary, as it is possible to provide local hypoxia by the above-described diffusion technique. The diffusion of carbon monoxide into a region supplied under normoxic conditions would provide high sensitivity in revealing regional oxygen insufficiencies. Furthermore, in an area affected by stroke, the hypoxia would presumably be readily observable without the need of altering the blood oxygen tension.

Suitable circuit arrangements for signal processing and timing the laser flash may be employed, for example, flash timing circuitry similar to that disclosed in the above-mentioned U.S. Pat. application Ser. No. 269,580.

While certain specific embodiments of improved techniques and apparatus for the spectrophotometric study of living tissue have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. Spectrophotometric apparatus for studying chemical reactions in living tissue comprising a source of radiant energy, a photosensitive signal-generating member, a probe chamber having a chemically permeable transparent wall portion engageable over an area of living tissue to be studied and allowing transmission of chemical reagents in the chamber to said area, light transmission means between said source and the chamber and between the chamber and the photosensitive member arranged to include said tissue area in the optical path between the source and the photosensitive member, and fluid conduit means connected to said chamber for admitting a chemical perturbation medium of a type which induces an optical effect on the tissue responsive to chemical reaction between the medium and the tissue.

2. The spectrophotometric apparatus of claim 1, and wherein said fluid conduit means comprises respective inlet and outlet ducts connected to said chamber at points spaced such that said chemically permeable wall portion is located between the connections, whereby the perturbation medium flows over said permeable wall portion.

3. The spectrophotometric apparatus of claim 1, and wherein said light transmission means includes a rotary filter disc having a plurality of spaced filter elements, said source and photosensitive member being mounted over one side of the disc and spaced so as to be simultaneously aligned with a pair of said filter elements, and respective light pipes mounted adjacent the other side of said disc and having ends respectively located in the optical paths containing said pair of filter elements, said source and said photosensitive member, the opposite ends of the light pipes being arranged adjacent each other inside the chamber and being directed toward said chemically permeable wall portion.

4. The spectrophotometric apparatus of claim 3, and wherein said opposite ends are merged together to define a bundle directed into the chamber.

5. The spectrophotometric apparatus of claim 3, and means to at times provide a short flash of photolyzing radiant energy in the chamber, comprising a radiant energy flash source and a light pipe coupling said flash source to said chamber, the outlet end of said last-named light pipe being merged with said opposite ends of the first-named light pipes to form a common bundle directed into the chamber.

6. The spectrophotometric apparatus of claim 1, and means to at times provide a short flash of photolyzing radiant energy in the chamber.

7. The spectrophotometric apparatus of claim 6, and wherein the means providing the short flash comprises a radiant energy flash source.

8. The spectrophotometric apparatus of claim 7, and a light pipe optically coupling said flash source to said chamber.

9. The spectrophotometric apparatus of claim 7, and wherein the radiant energy flash source comprises a liquid dye laser.

10. The spectrophotometric apparatus of claim 1, and wherein said chemically permeable wall portion comprises a transparent chemically permeable membrane adapted to overly said area of living tissue.

11. The spectrophotometric apparatus of claim 1, and wherein said source is monochromatic.

12. The spectrophotometric apparatus of claim 1, and wherein the light transmission means between the chamber and the photosensitive member includes an optical filter.

* * * * *